(12) United States Patent
Wu et al.

(10) Patent No.: US 6,348,903 B1
(45) Date of Patent: Feb. 19, 2002

(54) DYNAMIC DETERMINATION OF MOIRE INTERFERENCE ON A CRT DISPLAY WITH CORRECTION SELECTIVELY APPLICABLE TO SECTIONS OF LINES

(75) Inventors: Chin Tao Wu, New Brunswick; James Vincent Samuels, Monmouth Junction, both of NJ (US)

(73) Assignee: MultiVideo Labs, Inc., Princeton, NJ (US)

( * ) Notice: Subject to any disclaimer, the term of this patent is extended or adjusted under 35 U.S.C. 154(b) by 0 days.

(21) Appl. No.: 09/271,999

(22) Filed: Mar. 18, 1999

(51) Int. Cl.[7] .......................... G09G 1/06; H05B 37/00; H04N 3/22; H04N 1/46
(52) U.S. Cl. ...................... 345/10; 315/282.1; 348/806; 358/533
(58) Field of Search .............................. 345/10, 11, 12, 345/13, 14, 15; 348/177, 806, 807, 524, 745, 746, 747, 219, 571, 607, 608, 614, 618; 315/370, 379, 382, 382.1; 358/533, 454

(56) References Cited

U.S. PATENT DOCUMENTS

| | | | | |
|---|---|---|---|---|
| 5,107,188 A | * | 4/1992 | Rindal | 348/524 |
| 5,430,502 A | * | 7/1995 | Yamazaki et al. | 348/806 |
| 5,440,353 A | * | 8/1995 | Yamazaki et al. | 348/806 |
| 5,729,301 A | * | 3/1998 | Sluyterman | 348/806 |
| 5,747,933 A | * | 5/1998 | Beeteson et al. | 315/382.1 |
| 5,872,432 A | * | 2/1999 | Beeteson | 315/382.1 |
| 5,959,414 A | * | 9/1999 | Yoshida et al. | 315/382 |
| 5,969,757 A | * | 10/1999 | Okada et al. | 348/219 |
| 5,977,936 A | * | 11/1999 | Kitou et al. | 345/12 |
| 6,040,808 A | * | 3/2000 | Knox et al. | 345/13 |
| 6,094,018 A | * | 7/2000 | Fujimori et al. | 315/370 |
| 6,201,582 B1 | * | 3/2001 | Hentschel | 358/533 |
| 6,225,762 B1 | * | 5/2001 | Fujimori et al. | 315/370 |
| 6,246,447 B1 | * | 6/2001 | Hentschel | 348/806 |

* cited by examiner

Primary Examiner—Steven Saras
Assistant Examiner—Paul A Bell
(74) Attorney, Agent, or Firm—Carl M. Wright

(57) ABSTRACT

Lines or sections of lines on a scanned CRT display are checked to determine whether a moire pattern exists. The existence is determined by comparing the number of pixels occurring on a line or a section of a line to a reference count corresponding to a moire pattern. Substantial equality of the pixel count and the reference count enables a moire correction circuit for the section of the display containing the moire pattern. In sections of the display where the moire pattern does not occur, i.e., the pixel count and the reference count are not substantially equal, the moire correction circuit is automatically disabled.

16 Claims, 2 Drawing Sheets

DYNAMIC DETERMINATION OF MOIRE INTERFERENCE ON A CRT DISPLAY WITH CORRECTION SELECTIVELY APPLICABLE TO SECTIONS OF LINES

DOCUMENTS INCORPORATED BY REFERENCE

U.S. Pat. No. 5,440,353 is incorporated by reference to show a horizontal moire cancellation circuit which is useful in the invention described below.

BACKGROUND OF THE INVENTION

1. Field of the Invention

The invention relates generally to cathode-ray tube displays and particularly to raster scanned displays, especially color displays. More particularly, it relates to automatically correcting such displays to eliminate or at least substantially reduce horizontal moire interference.

2. Background

Moire effects create ripple effects in video displays which smear detail and detract from the picture quality. Corrections may be applied to the video signals to suppress moire effects. To correct for horizontal moire, the lines of the display are slightly delayed. In the prior art, correction of horizontal moire are manually activated and the correction is applied to the entire screen. When only a section of the display requires correction, applying the correction to the entire screen degrades resolution of the displayed image and defocuses all or part of the display.

BRIEF SUMMARY OF THE INVENTION

In accordance with the invention, the existence of a moire pattern on a display is determined automatically. A count of the number of pixels occurring in horizontal lines of a scanned CRT display is made and compared to a reference count. If the counts are substantially equal, a moire correction circuit is enabled for that section of the display. Sections of each horizontal line can be separately checked for the presence of a moire pattern. The moire correction circuit is automatically disabled for sections of the display for which it is not required.

BRIEF DESCRIPTION OF THE DRAWING

The invention is described in detail by referring to the various figures of the drawing which illustrate specific embodiments of the invention, and wherein like numerals refer to like elements.

DETAILED DESCRIPTION OF THE INVENTION

Figure 1:
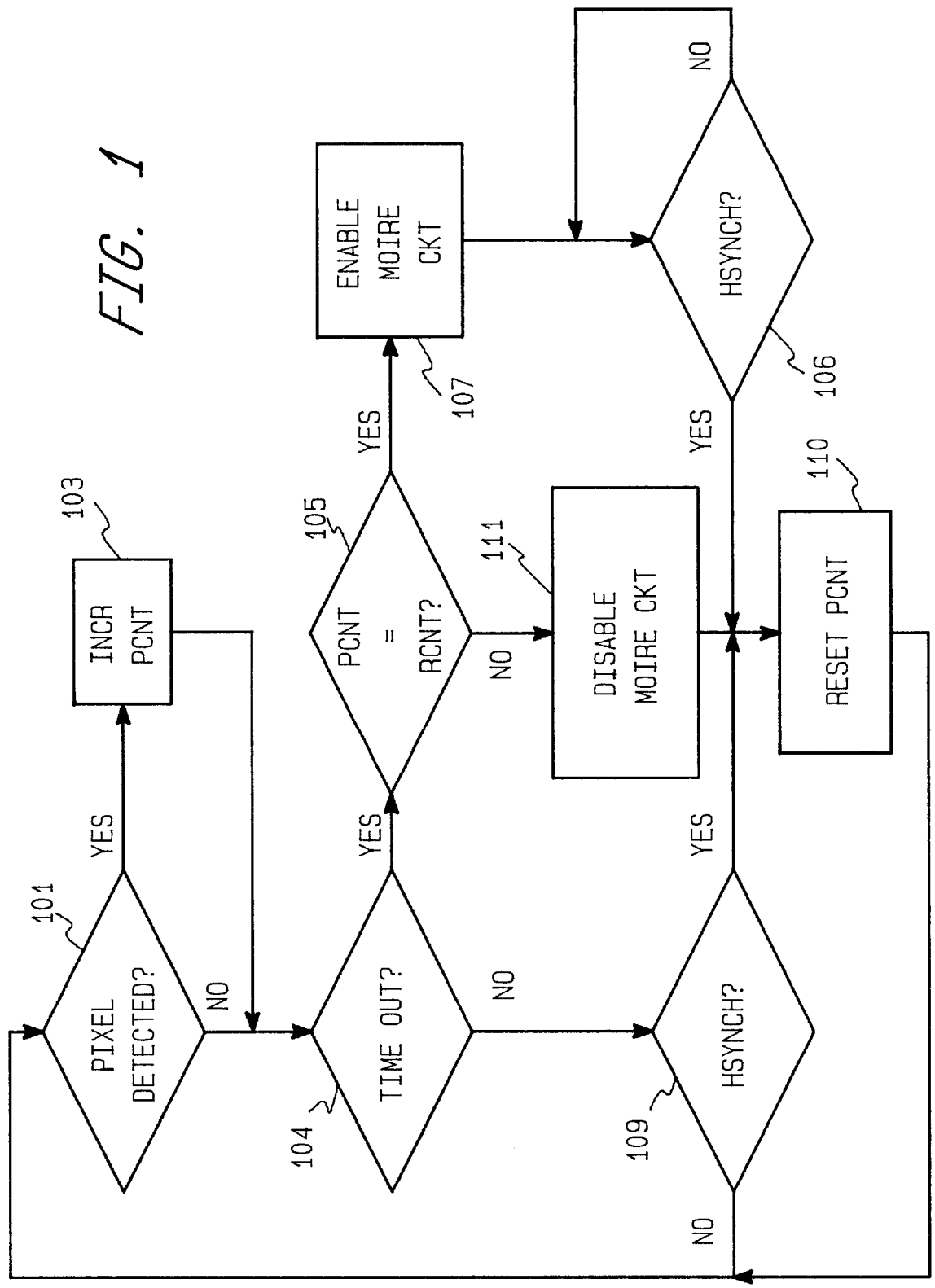
FIG. 1 is a flowchart depicting a sequence of operations according to the invention.

The principle of operation according to the invention is shown in FIG. 1. In the following description, references are made to a flowchart depicting the sequence of operations performed by a program. The symbols used are standard flowchart symbols accepted by the American National Standards Institute and the International Standards Organization. In the explanation, an operation may be described as being performed by a particular block in the flowchart. This is to be interpreted as meaning that the operations referred to are performed by programming and executing a sequence of instructions that produces the result said to be performed by the described block. Alternatively, the operation may be performed by apparatus designed for the purpose. The actual program instructions used depend on the particular processor used to implement the invention. Different processors have different instruction sets but persons of ordinary skill in the art are familiar with the instruction sets with which they work and can implement the operations set forth in the blocks of the flowchart.

A color display is produced by modulating the three electron beams, one for each of the basic colors: red, blue, and green. The electron beams strike a phosphor which produces the corresponding color. The electron beam for each color is directed to the correct phosphor and is blocked, using a mask, for example, from striking the wrong color phosphor on the screen. Some color displays use a timing circuit and alternating stripes of phosphors to cause each electron beam to strike the correct phosphor and to avoid striking the other phosphors.

The electrons striking the phosphor create a dot of the corresponding color. Such dots are referred to as picture elements or pixels for short. The close proximity of varying pixel colors creates a blending of the basic colors to produce combinations of colors.

Because of mechanical tolerances in the mask or in the timing, the electron stream may be misaligned for certain color pixels so that the electrons do not always strike the correct phosphor dot or stripe exactly in the latter's center. As a result, the pixel is not completely illuminated. This creates a moire pattern. The problem is most noticeable when the display driver is attempting to turn on and then off adjacent pixels of the same color. For purposes of this explanation, the situation where an electronic beam is turned on and off at a rate that creates a moire interference is referred to as overmodulation.

Correction of moire patterns is more complicated when a monitor is capable of multifrequency operation. That is, for example, a monitor designed to work in cooperation with more than one type of computer display driver. Not all computer display drivers operate at the same frequency so the monitor is designed to perform at more than one frequency.

The presence of a moire pattern in the display can be detected by the occurrence of a predetermined number of pixels during a given time period.

In FIG. 1, a modulation (or pixel) detector recognizes the occurrence of pixels in a display stream. When a pixel is detected (101), a pixel count value (PCNT) is incremented (103). If the TIME OUT signal does not occur (104) but the horizontal synchronization signal (HSYNCH) does (109), then PCNT is reset (110).

If the TIME OUT signal does occur (104), then PCNT is compared to a predetermined reference count value (RCNT). If PCNT is equal or substantially equal to RCNT (105), a moire correction is enabled (107). The circuit than waits for an HSYNCH signal (106) to reset PCNT (110). If, after the TIME OUT signal occurs (104), PCNT does not substantially equal the reference count RCNT (105), then the moire correction circuit is disabled (111) and PCNT is reset (110).

The TIME OUT signal is generated by a timing circuit and can be adjusted so that several sections of a horizontal line can be checked for the occurrence of a moire pattern.

Figure 2:
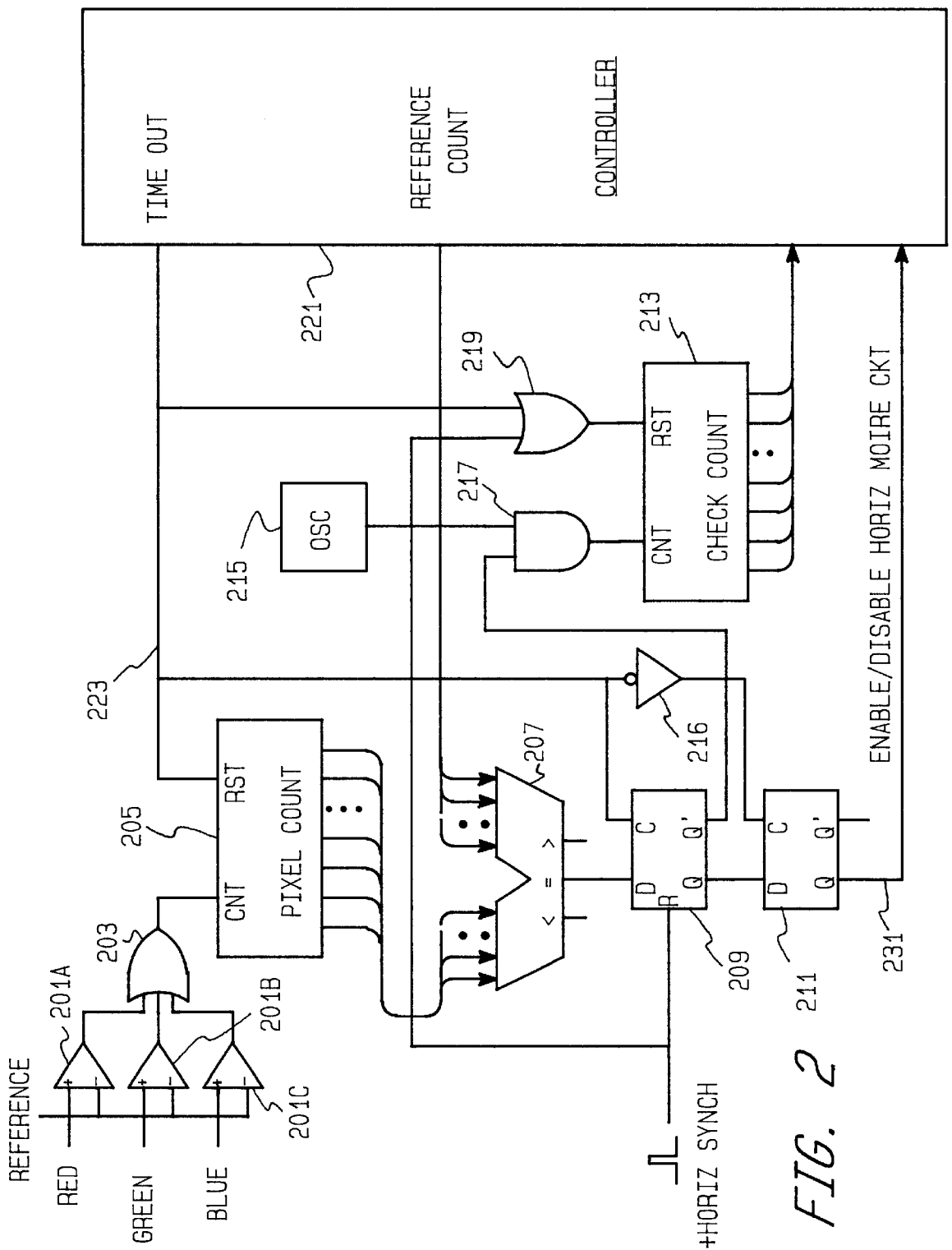
FIG. 2 is schematic diagram of an embodiment of the invention.

Details of an embodiment of the invention are shown in FIG. 2. Three operational amplifiers 201A, 201B, and 201C are coupled to receive pixel information from an associated video driver circuit for displaying color signals on a scanned cathode-ray tube display system. When any one of the red, green, or blue video signals exceeds a reference value, an enabling signal is supplied to an OR gate 203. The output signal from the OR gate 203 increments the count value (PCNT) in a pixel counter 205. As a result, the pixel counter 205 contains the number of pixels which have been displayed since a reset signal had been applied.

The output count from the pixel counter 205 is applied to one set of input terminals of a comparator 207. Input signals to the other input terminals of the comparator 207 are signals representing a reference count (RCNT) supplied by a controller 221 which can include a microprocessor. The reference count corresponds to a number of pixels over a predetermined period of time that would indicate that a horizontal moire problem existed. Such a value depends on the horizontal frequency of the particular display system in which the invention is installed.

The reference count depends on several factors. As an example, the reference count can be determined as $$\frac{\text{horizontal display size}}{2(\text{dot pitch})(\text{number of sections per horizontal line})}.$$

That is, the reference count, $$RCNT = \frac{pps}{2}$$

where $$pps = \frac{np}{s}.$$

The value of np is the total number of pixels in one horizontal line across the screen and is given by $$\frac{d}{p}$$

where d is the horizontal display size, e.g., in millimeters, and p is the CRT's dot pitch, spacing between adjacent dots of the same color phosphor, e.g., in millimeters. The value s is the number of sections to be checked along a horizontal line. For example, a typical value might be 10. The divisor 2 in the RCNT equation arises from the fact that an on/off sequence is being checked for.

The TIME OUT signal on line 223 in FIG. 2 is generated by a check count. A check counter 213 is incremented by the output signal from an AND gate 217 which is primed by the reset output signal from a MATCH flip-flop 209 and enabled by an output signal from an oscillator 215. The check count is supplied to the controller 221 and when it reaches a predetermined value, the TIME OUT signal 223 is generated. Alternatively, the check count can be maintained inside the controller 221 by an internal clock and enabled by the reset signal from the MATCH flip-flop 209 via an input port. Other implementations will be recognized by those of ordinary skill in the art.

The check count, CC, depends on the number of sections to be checked on each horizontal line, designated by s. The horizontal frequency, h, of the display is determined by the controller. Therefore, the time required for a beam to travel across the entire screen is $$t = \frac{1}{h} - r$$

where r is the horizontal retrace time, i.e., the time for the beam to go from the end of one line to the beginning of the next line. Dividing t by s gives the time for the beam to move across a section of a line to be evaluated; that is, $\tau = t/s$ and the check count is $CC = \tau \times c$ where c is the frequency of the oscillator 215.

As an example, if 640 pixels in a given time during the scanning of a horizontal line would produce a moire effect, then the reference count would be set to $$\frac{640}{2}$$

or 320. This would be represented by a binary signal of 101000000, requiring nine bits. In one embodiment, only the most significant seven bits of both counts would be applied to the comparator 207. By eliminating the least significant two bits of the pixel count and the reference count, the comparison of the pixel count and the reference count will indicate equality within a value of ±4.

When a TIME OUT signal occurs on line 223, the MATCH flip-flop 209 will be set if PCNT=RCNT±4, for example. When the TIME OUT signal goes low, the setting of the MATCH flip-flop 209 is transferred to a flip-flop 211 by a clock signal derived from an inverter 216. On a line 231, the set condition of the flip-flop 211 will enable a horizontal moire circuit during the time it is set. A suitable horizontal moire canceling circuit is described in detail in U.S. Pat. No. 5,440,353 incorporated herein by reference.

The occurrence of a horizontal synchronization signal resets the MATCH flip-flop 209 and the check counter 213 via an OR gate 219. The check counter 213 is also reset by the TIME OUT signal via the OR gate 219.

Any or all parts of the invention described can be incorporated in software to operate according to the description set forth above. A hardware implementation has several advantages including faster operation independently from a microprocessor. Performing the reference count in the controller 221 has the advantage that the system of the invention can be incorporated to accommodate display systems with differing horizontal frequencies.

The arrangement of the system according to the invention permits the moire correction circuit to be enabled by other means such as by the user via an input to the controller in accordance with the prior art.

While the Invention Has Been Particularly Shown and Described with Reference to a Preferred Embodiment Thereof, it Will Be Understood by Those Skilled in the Art That Various Changes and Modifications in Form and Details May Be Made Therein Without Departing from the Spirit and Scope of the Invention According to the Following Claims.

What is claimed is:

1. A combination in a CRT display system comprising:
   a horizontal moire correction circuit;
   an overmodulation detector including
     a counter;
     pixel recognition circuit for incrementing the counter;
     a reference source for supplying signals representative of a number of pixels per a time period corresponding to moire interference;
     a comparator responsive to the counter and to the reference source for supplying a signal when the counter and reference source are substantially equal; and a timer for supplying the signal from the comparator to the coupling means; and coupling means responsive to the overmodulation detector for activating the horizontal moire correction circuit when overmodulation is detected and including means for deactivating the horizontal moire correction circuit when overmodulation is not detected.

2. The combination of claim 1 further including:

resetting means responsive to a horizontal synchronization signal from the CRT display system for initializing the counter.

3. The combination of claim 1 wherein the pixel recognition circuit includes:

a plurality of voltage comparators, each responsive to a particular CRT display signal, for supplying a signal when a corresponding CRT input signal exceeds a predetermined value; and collecting means coupled to the counter and responsive to the signals from each voltage comparator for supplying a signal when any CRT input signal exceeds the predetermined value.

4. A method for selectively activating a horizontal moire correction circuit in a CRT display system comprising the steps of:

detecting overmodulation of the CRT display by
counting pixels occurring during a given period of time; and
comparing a pixel count with a reference count;

activating the horizontal moire correction circuit when overmodulation is detected; and deactivating the horizontal moire correction circuit when overmodulation is not detected.

5. The method of claim 4 wherein the counting step includes the steps of:

detecting the occurrence of a pixel; and
incrementing the pixel count when a pixel occurs.

6. A circuit for selectively activating a horizontal moire correction circuit in a CRT display system comprising:

means for detecting overmodulation of the CRT display including
means for counting pixels during a given time period, and
means for comparing a pixel count with a reference count; and means responsive to the detecting means for activating the horizontal moire correction circuit when overmodulation is detected and for deactivating the horizontal moire correction circuit when overmodulation is not detected.

7. The circuit of claim 6 wherein the counting means includes:

means for determining the occurrence of a pixel; and
means for incrementing the pixel count when a pixel occurs.

8. A CRT system comprising:

display means responsive to color signals for displaying said color signals as pixels on a screen;

means responsive to the display means for determining that a color signal occurred;

means responsive to the determining means for ascertaining that a given number of pixels occurred during a predetermined time period; and horizontal moire correction means activated by the ascertaining means.

9. The system of claim 8 wherein said ascertaining means includes:

pixel detecting means;
counter means incremented by the pixel detecting means;
comparator means responsive to a reference value and the counter means; and
timing means for resetting said counter means.

10. A system for selectively correcting moire pattern interference on a CRT display screen comprising:

a controller means for supplying a reference count and a system reset signal;

a plurality of voltage comparators responsive to display signals;

collector means responsive to the plurality of voltage detectors for supplying a signal when a display signal exceeds a predetermined threshold value;

pixel counter means responsive to the collector means for incrementing a pixel count value;

comparator means responsive to the pixel counter means and to the reference count for supplying a signal when the pixel count value is equal to the reference count;

timing means supplying a signal to the controller means for initiating the system reset signal; and means responsive to a signal from the comparator for activating a horizontal moire correction circuit.

11. The system of claim 10 wherein the timing means includes:

means for supplying periodic time base signals;
counter means responsive to the supplying means for incrementing a time count value; and
means for coupling the time count value to the controller means.

12. The system of claim 11 further including means responsive to a horizontal synchronization signal for resetting the time count value.

13. A method of dynamically correcting moire patterns in scanned CRT displays comprising the steps of:

specifying a first value indicative of a number of pixels per unit time that would cause a moire pattern on a display;

determining a second value representing a number of pixels occurring on the display in a unit time; and activating a moire correction system if the first and second values are substantially equal.

14. The method of claim 13 including the step of deactivating a moire correction system if the first and second values are not substantially equal.

15. A method as claimed in claim 13 wherein said determining step includes the steps of:

incrementing a counter when an occurrence of pixel occurs;

comparing contents of the counter with the first value to supply a signal indicating substantial equality; and coupling the signal from the comparing step to the moire correction system.

16. A combination for activating a moire correction circuit comprising:

a pixel counter;
a comparator responsive to the pixel counter and to a reference value for indicating substantial equality; and
a timer for supplying an activation signal if the comparator indicates substantial equality between the pixel counter and the reference value.

* * * * *